(12) United States Patent
Filgate

(10) Patent No.: US 6,178,521 B1
(45) Date of Patent: Jan. 23, 2001

(54) METHOD AND APPARATUS FOR DISASTER TOLERANT COMPUTER SYSTEM USING CASCADED STORAGE CONTROLLERS

(75) Inventor: Bruce D. Filgate, Boylston, MA (US)

(73) Assignee: Compaq Computer Corporation, Houston, TX (US)

( * ) Notice: Under 35 U.S.C. 154(b), the term of this patent shall be extended for 0 days.

(21) Appl. No.: 09/083,818

(22) Filed: May 22, 1998

(51) Int. Cl.$^7$ .................................................. G06F 11/00
(52) U.S. Cl. ................................................ 714/6; 711/161
(58) Field of Search .................................. 711/161, 162; 714/5, 6, 7

(56) References Cited

U.S. PATENT DOCUMENTS

| | | | |
|---|---|---|---|
| 5,155,845 | * 10/1992 | Beal | 714/6 |
| 5,193,154 | * 3/1993 | Kitajima | 707/204 |
| 5,212,784 | * 5/1993 | Sparks | 714/6 |
| 5,404,508 | * 4/1995 | Konrad | 707/202 |
| 5,615,329 | * 3/1997 | Kern | 714/6 |
| 5,796,684 | * 8/1998 | Yaegashi | 369/30 |

* cited by examiner

Primary Examiner—Robert W. Beausoliel, Jr.
Assistant Examiner—Bryce Bonzo
(74) Attorney, Agent, or Firm—William J. Kubida; E. Michael Byorick; Hogan & Hartson LLP

(57) ABSTRACT

A disaster tolerant computer system for protection of electronic databases is achieved by cascading storage controllers to accomplish local and remote disk shadowing. A host computer is connected to a local superordinate storage controller via a local data bus. The superordinate storage controller transmits data via a long haul data link to a remote subordinate storage controller. Additionally, the superordinate controller transmits data to a local subordinate storage controller via a local data bus. Consequently, in-band storage capacity is provided remotely, as well as locally, to increase data storage capacity for database shadowing. Furthermore, the cascading of controllers may be used to increase the effective storage capacity of the computer system by using the increased storage capacity for the writing of non-redundant data.

9 Claims, 4 Drawing Sheets

METHOD AND APPARATUS FOR DISASTER TOLERANT COMPUTER SYSTEM USING CASCADED STORAGE CONTROLLERS

FIELD OF THE INVENTION

The invention relates generally to the field of computer systems and the storage of data therein.

BACKGROUND OF THE INVENTION

Computer systems have become the primary means for individuals and organizations to manipulate and store data. Typically, the larger the amount of data to be stored and manipulated, the larger the reliance on a computer system. Often, large amounts of data are stored in one or more databases, where the data is organized into a database structure. Today, it is increasingly common for an entity which is responsible for controlling significant amounts of data to institute computer based systems, using electronic storage of data and databases. For example, banks, insurance companies, investment companies, retailers, government agencies, universities, and others all keep databases of customer lists, accounts, inventories, and so on in electronic storage.

When information in a database is considered critical, it is often considered prudent to take steps to preserve such data. A common approach to preserving electronic data is to use a computer system which not only stores the new data in databases, but also makes copies of those databases. In one approach, database copies are made at regular fixed intervals of time, e.g., a daily copy of a stores sales data for the day. Periodic copies, also referred to as back-ups, are used when the risk of loss of information is not so great as to justify the additional expense associated with real-time copies. Using another approach, copies may be made in "real-time", where the copied data is kept current by copying the main database as it changes. One example where such real-time copies are customary is in the banking industry, where large banks may have thousands of accounts changing each minute and the loss of the data for the myriad transactions throughout the day could prove catastrophic. The process of writing data or databases in real-time to multiple storage locations is referred to as "shadowing" or "mirroring", which yields multiple copies of the data or database.

With the need to keep multiple copies of such large amounts of data comes the need for large data storage capacities. The storage of large amounts of data is typically referred to as "mass storage", wherein the data is stored in mass storage devices. With large computer systems and networks serving an increasingly wide variety of entities and storing a wide variety and amount of data, mass storage devices are becoming the norm. One increasingly popular form of mass storage device is a disk array. A disk array is commonly defined as a collection of disks combined, coordinated and managed by some form of array management software. An increasingly popular form of disk array is the "redundant array of independent disks" (RAID). A RAID is a special type of disk array which is intended for uses involving the storage of redundant, i.e., copied, data.

Depending on how a RAID is configured and used, it can be classified as being of a certain RAID Level, i.e., Level 0–6, defined by the RAID Advisory Board, Inc. (RAB). The RAB is an organization which seeks to standardize and promote the use of RAID devices and related products. The RAB defines RAID levels in their publication *The RAIDBook*, Nov. 18, 1993.

There are various methods of storing information in a RAID, e.g., shadowing or striping data. When data is written to a storage device by striping, it is broken into blocks of data, wherein the blocks of data are written, or distributed, among the disks within the array. Disk striping is used to expand the overall storage capacity of a computer system for the storage of original, i.e. non-redundant, data. With disk striping, copies of original data are not made. Therefore, strictly speaking, a disk array configured for disk striping is not a true RAID. However, within the art, disk striping may be referred to, and is defined by the RAB, as a "RAID Level 0" system. As an example, a disk array which comprises six one-gigabyte disks is capable of storing about six gigabytes of new data. However, none of the newly stored data is also written to another location within the disk array, to yield a copy. The disk striping system of this example may be said to have an "effective storage capacity" of six gigabytes. Effective storage capacity refers to how much non-redundant data can be stored by a system or disk array.

Within RAID Levels 1–6, there are a variety of configurations which all store redundant data in slightly different ways. For illustrative purposes, the writing of redundant data by disk shadowing will be emphasized. Basically, disk shadowing is the creating of copies of data by writing the data to multiple disks within an array in real-time. Therefore, shadowing yields less effective storage capacity than does disk striping. For example, if there was a RAID of six one-gigabyte disks configured for disk shadowing, the effective storage capacity of the RAID may be calculated to be one gigabyte, assuming five of the one-gigabyte disk drives are used for storing redundant data.

Another characteristic of the current information age is the increasingly distributed nature of computer systems. In such distributed systems, it is often the case that access to a main database may be gained from a wide variety of remote locations. For example, an insurance company may have satellite offices throughout the country, each with a local area network (LAN) which connects to a remote central computer network over a long haul link, wherein the central network includes devices which store the company's databases of client policy information. Computers in the satellite offices rely on connectivity to the remote central computer network for access to client policy information. However, if the remote central computer network losses connectivity with the satellite offices by, for example, a power outage or equipment failure, the overall system becomes inoperable. In another example of a distributed computer system, a bank may use centralized databases, with certain degrees of access to client accounts available at automated teller machines (ATMs) worldwide. As with the insurance company example, loss of connectivity to the bank's central databases, or their corruption or malfunction, causes the entire system to become inoperable. With such distributed computer systems and reliance on critical data contained therein, it is desirable to achieve the benefits of database copies within the distributed system.

As shown in FIG. 1, a computer system using typical prior art devices is capable of storing and copying data. The host computer 110, may be a workstation, such as an Alpha workstation by Digital Equipment Corporation ("Digital") of Maynard, Mass., or a server on a LAN. The host computer 110 runs applications which seek to manipulate or store data using the disk controllers 120 and 140. The host computer 110 communicates with controller 120 via a local data bus 115. The local controller 120 interfaces with the local data bus 115 at what is referred to as its "front-end". The front-end of the controller 120 receives data to be written to storage devices in connection with the controller's 120 "back-end". The local controller 120 channels the data provided by host computer 110 to a number of devices at its back-end over buses 130. The number of data buses originating from the back-end of a controller typically corresponds to the number of ports available at its back-end. As can be seen from the figure, two of the buses on the back end of the local controller 120 connect directly to local storage devices 125. A collection of storage devices 125 at the back-end of the controller 120 may be considered a RAID. These disks 125 provide a medium for local storage of data to be used in conjunction with the operations of host computer 110 or other devices on the LAN.

For a variety of reasons, it may be desirable to store copies of main databases remotely as well as locally. Referring to the previous example, if a bank using a distributed computer system relies on its remote central databases for information and loses connectivity with the central databases by, for example, power outage or equipment failure, the overall system becomes inoperable. Similarly, if the central databases become corrupted through computer hacking or a computer virus, it may be undesirable to use the compromised databases. Therefore, a bank may wish to have several remote databases which are all kept current by, for example, the process of database shadowing. In such a system, should the bank lose the primary database site due to some loss of communications, database malfunction, or other such catastrophe, the bank has available another database site within its network containing the same information. The redundant site allows the bank to continue to transact business without an impact from the loss of their primary database site. Such a system is referred to as a "disaster tolerant" system.

Again referring to FIG. 1, one possible configuration of proprietary storage controllers used for storing data remotely and achieving a disaster tolerant system is shown. The storage controller is considered proprietary because the vendor of the controller does not make technical information about the interface 165 available to those who acquire or use the controller. In this example, a communication path 180 connects the proprietary interfaces of the controllers 120 and 140 to accomplish remote "out-of-band" communications between two compatible disk controllers. "Out-of-band" communications refers to data from host 110 that gets channeled off of the standard data bus within the local controller 120, which passes data from the front-end port to the back-end ports, and redirected to the proprietary interface 165. In such a proprietary disaster tolerant system, the communication path 180 comprises the following elements: local proprietary interface 165 within local controller 120, remote proprietary interface 175 within remote controller 140, local and remote data lines 160, 170, local and remote modems 135, 137 and long haul data link 136. The proprietary interfaces 165, 175 provide a physical and logical means by which to have data sent by the local superordinate controller 120 in a format which is interpretable by the remote subordinate controller 140. Once the data is received and interpreted by remote controller 140, it transmits the data to storage devices 145 at the back-end 150 of controller 140.

Because proprietary data is generally not made available to users, the disk controller vendor is often required to configure the proprietary interface within the disk controller for disaster tolerance. This typically results in a customized controller which is not fully maintainable by the owner of the system. Therefore, systems which use proprietary controllers to achieve remote database copies are relatively expensive in terms life cycle cost. "Life cycle cost" is the term used to encompass the expense of acquiring, configuring, operating, maintaining, and disposing of a device.

SUMMARY OF THE INVENTION

In accordance with the present invention, a disaster tolerant computer system is provided that cascades standard disk storage controllers to shadow a computer database to a remote location. While shadowing may also be to a local disk controller, the invention is particularly useful for shadowing a local database to a remote location, which results in the overall preservation of data and system robustness in the case of a catastrophe at the primary site. By cascading controllers such that a second controller receives data from one of the back-end ports of a first controller, the data shadowing process can be conducted without the need for proprietary or custom controllers. Furthermore, the second controller may then be located at a remote site, and receive the data from the first controller via transmission over a long distance communication link.

In a first embodiment, a disaster tolerant computer system is achieved by cascading controllers, such that a remote subordinate controller appears as an "in-band" storage device to a local superordinate controller. With respect to the present invention, the term "in-band" refers to a device which receives data from one of the standard disk controller ports. Data recieved by the local superordinate controller is transmitted from that controller's back-end to a local bridge, which then converts and transmits the data to a remote bridge via a long haul data link. The remote bridge then converts and transmits the data to the front-end of a remote subordinate controller. The remote subordinate controller then writes the received data to the storage devices connected to its back-end.

In another embodiment, a disaster tolerant computer system is achieved by cascading controllers, wherein a local superordinate controller is in communication with a local subordinate controller via a local databus. Furthermore, the local superordinate controller is in communication with a remote subordinate controller via a long haul communication path, as discussed above. Each of the subordinate controllers receives data at its front-end from a respective back-end port of the superordinate controller. In this way, the local subordinate controller provides additional storage capacity to the local superordinate controller. While, the remote subordinate controller provides disaster tolerance to the system.

In yet another embodiment, a dual host disaster tolerant computer system is achieved. The configuration of the computer system places a host, a superordinate controller and a subordinate controller at each of two physically remote sites. Each host connects directly to the superordinate controller at its site. Each superordinate controller connects in-band to each of the local and remote subordinate controllers. Therefore, local and remote copies are gained for each host. In this way, a completely redundant disaster tolerant system is achieved.

BRIEF DESCRIPTION OF THE DRAWINGS

The above and further advantages of the invention may be better understood by referring to the following description in conjunction with the accompanying drawings described below.

DESCRIPTION OF THE PREFERRED EMBODIMENTS

Figure 1:
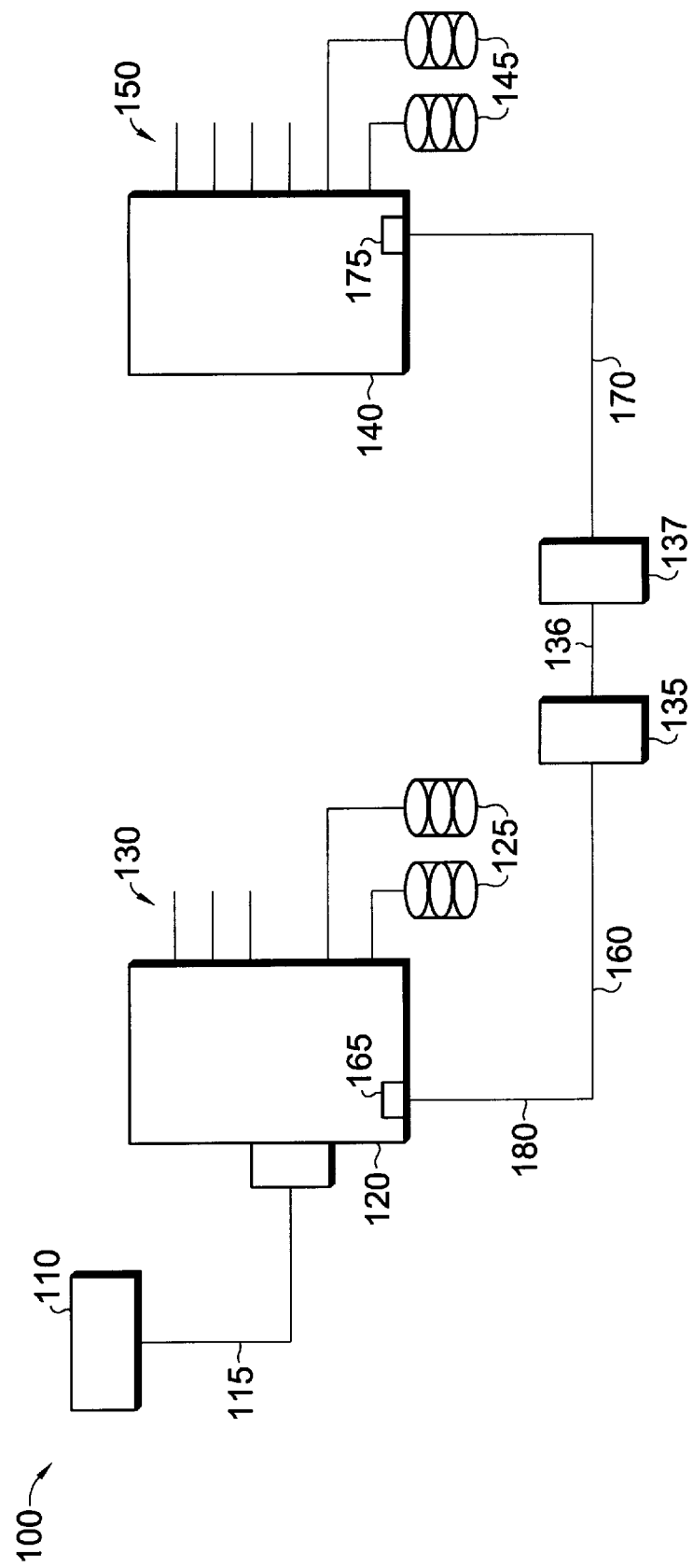
FIG. 1 is schematic diagram of a prior art computer system which accomplishes remote copying of system databases using a proprietary out-of-band channel.
Figure 2:
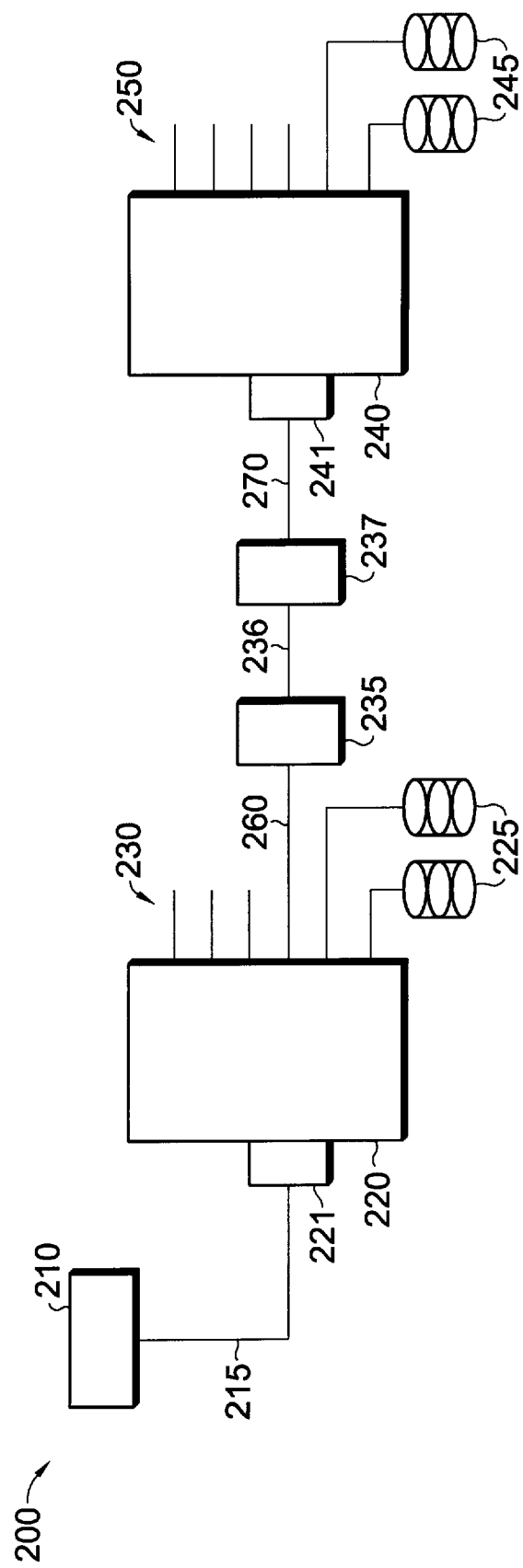
FIG. 2 is a schematic diagram of a computer system which cascades controllers to achieve an in-band disaster tolerant system in accordance with the present invention.

The present invention provides a disaster tolerant computer system which uses in-band remote back-up of electronic data using cascaded storage controllers. In FIG. 2, a first embodiment of a disaster tolerant computer system is shown. The controllers in this embodiment are configured as disk shadowing RAIDs. Host computer 210 serves as the initiator of activity relative to the other devices within the system. In this embodiment, the host computer 210 is a file server operating within a LAN which is responsive to other devices within the network. Such other devices may include, for example, an Alpha workstation running a VMS operating system, both products of Digital.

Host computer 210 is connected to a superordinate controller 220 using a local data bus 215. In the preferred embodiment, the data bus 215 and the other devices which comprise the system use a standard SCSI interface as a means for local communications. Host computer 210 passes data for storage to the local superordinate controller 220. In the preferred embodiment, the controllers 220, 240 are HSZ80 disk controllers by Digital, although other disk controllers may be used herein as well. The controller 220 provides the basic capability to write data received at its front-end 221 to standard SCSI devices connected to its back-end 230. Typically, the devices connected at the back-end of the controller 220 are SCSI disk storage devices 225, e.g., magnetic disk drives. However, in the present invention, a remote subordinate controller 240 is also in communication with one of these SCSI ports 230.

A SCSI data bus 260 connects the back-end of the local superordinate controller 220 to a SCSI port in a local bridge 235. Bridge 235 is a communication device which, in this embodiment, converts the parallel data it receives from the local SCSI bus 215 to serial data for long haul transmission. Once the bridge 235 converts the data it receives, it transmits the data across a long haul link 236 to a remote bridge 237. The remote bridge 237 receives the serial data and converts it back to parallel SCSI data. Bridge 237 then transmits the converted data to the front-end 241 of the remote controller 240 via SCSI bus 270. Bridges 235, 236 may be any commonly available communication bridges which include a local data bus port compatible with the local data bus and a long haul link port compatible with the long haul link, for example bridge DS-DWZGA-AA by Digital. Together, bridges 235, 237 and link 236 comprise one of a variety of possible long haul communication paths which could be used within the disaster tolerant system 200, and are not intended to limit the scope of the invention.

Once the remote controller 240 receives the data, it channels the data to its back-end ports for copying to storage devices, such as magnetic storage disks 245. The combination of the long haul communicaiton path and remote subordinate controller 240 appear as a local in-band storage device to controller 220. Since controllers 230 and 250 are standard devices, the additional expense associated with the use of a proprietary out-of-band channel to achieve a disaster tolerant distributed computer system is not required. Additionally, the system benefits from the flexibility to cascade multiple controllers from the superordinate controller or subordinate controllers.

Figure 3:
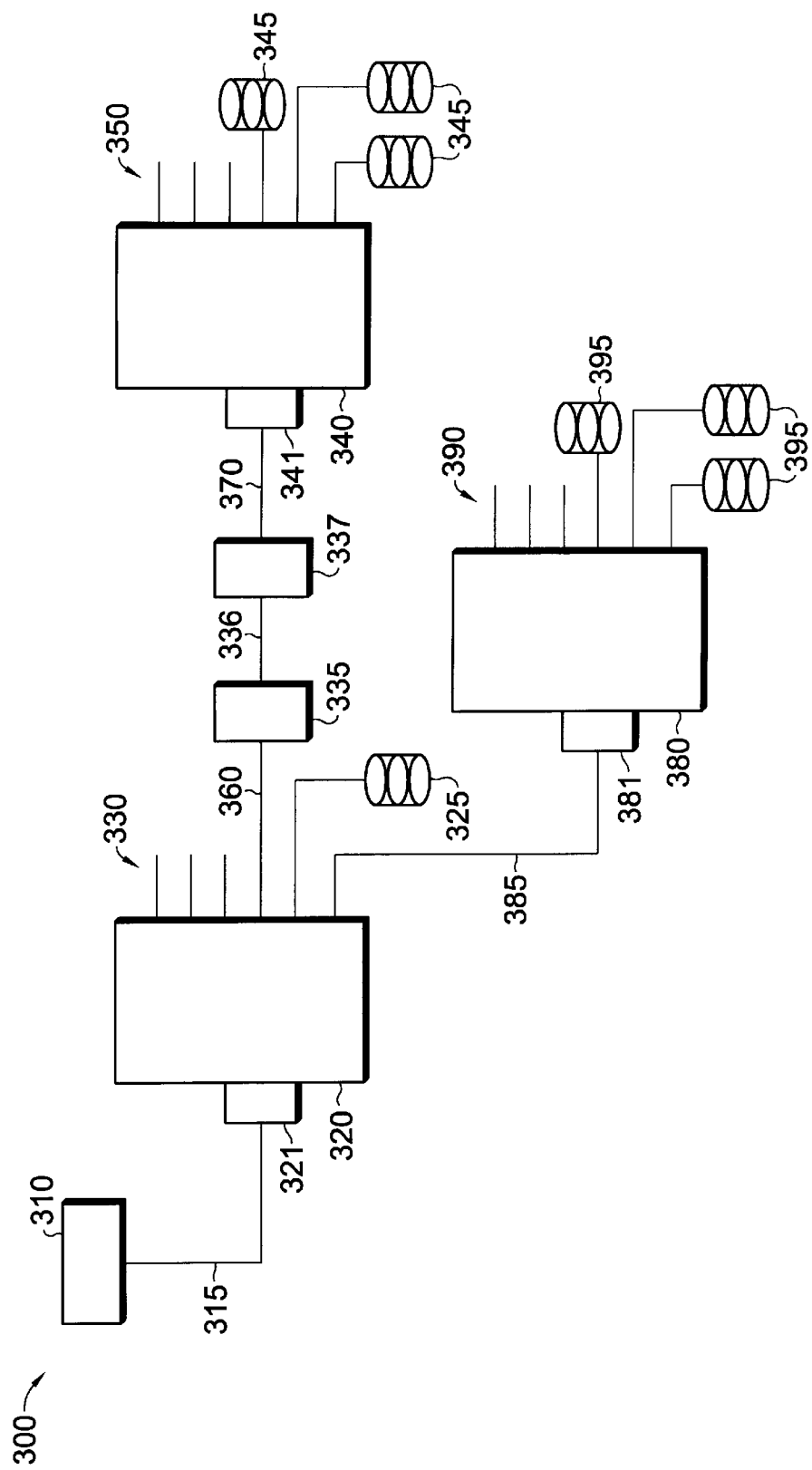
FIG. 3 is a schematic diagram of a computer system which cascades controllers to achieve an in-band disaster tolerant system while expanding the storage capability of a local database in accordance with the present invention.

Another embodiment of a disaster tolerant computer system 300 in accordance with the present invention is shown in FIG. 3. The controllers in this embodiment are again configured as disk shadowing RAIDs. The disaster tolerant computer system 300 provides not only a remote copy of the original data stored in devices 325, but also includes the protection of a local copy using controller 380 and storage devices 395. A host computer 310, e.g., a file server, is connected to the front-end 321 of a local superordinate disk controller 320, via local SCSI data bus 315. The controller 320 takes data received from host 310 and channels it to each of its back-end ports 330. Connected to one port is storage disk 325, which allows for local main storage of the data. Additional disks 325 could also be placed in connection with other available ports 330 to increase the storage capacity of the computer system 300. Connected to a different back-end port 330 of controller 320 is a remote communications path, which includes bridges 335, 337 and long haul data link 336. Data from host computer 310 is copied to storage devices 345 in the same manner as described in FIG. 2 for the storage of data on remote storage devices 245. Finally, connected to yet another back-end port 330 of the superordinate controller 320 is the front-end 381 of local subordinate controller 380, which receives data via SCSI bus 385. Controller 380 allows additional copies of the original data sent by host 310 to be made locally on storage devices 395. To the superordinate controller 320, each subordinate controller 340, 380 appears as an in-band SCSI storage device.

Figure 4:
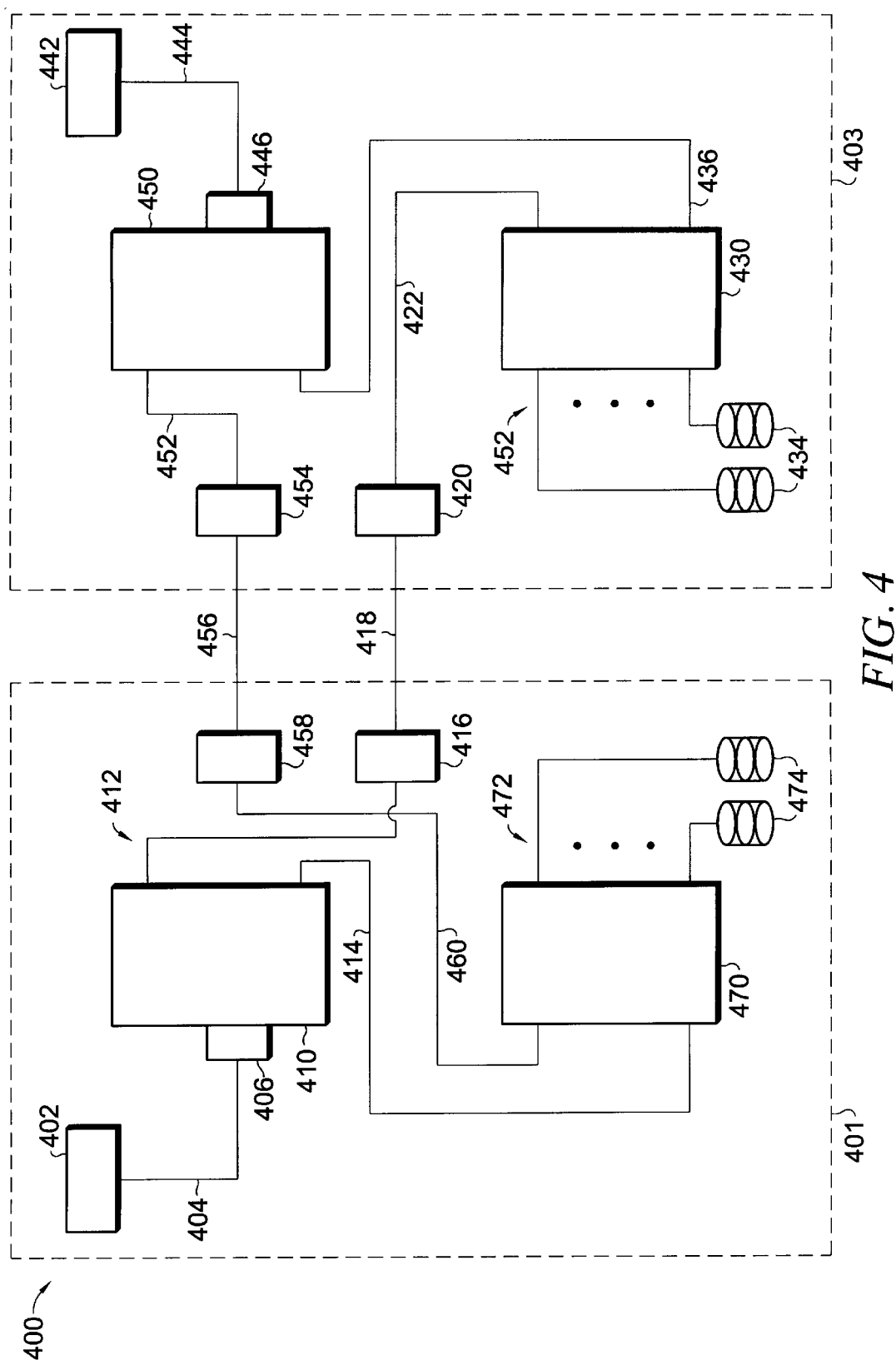
FIG. 4 is a schematic diagram of a computer system which cascades controllers to achieve a dual host in-band disaster tolerant system in accordance with the present invention.

Another embodiment of a disaster tolerant computer system 400 in accordance with the present invention is shown in FIG. 4. The disaster tolerant computer system 400 shown has two similar sites, each of which has a host computer, a superordinate controller, and a subordinate controller. As configured, the sites are substantially similar, and accomplish a remote shadowing capability by having the subordinate controller at each site copy the data for both hosts. As in the previous embodiment, the controllers in this embodiment are configured as disk shadowing RAIDs. For the purposes of describing the computer system of FIG. 4, one site will be referred to as the "local" site and the other will be referred to as the "remote" site. More particularly, the site components surrounded by broken line 401 will be referred to as being at the local site, while the components surrounded by the broken line 403 will be referred to as being at the remote site.

A host computer 402, e.g. a file server, transmits data to a local superordinate controller 410 at its front-end 406 via a SCSI data bus 404. The data is channeled within the controller 410 to each of its back-end ports. At least a portion of this data exits controller 410 at one of its back-end ports and is transmitted over SCSI bus 412 to a local bridge 416, ultimately to achieve remote shadowing of the data. Bridge 416 converts and transmits the data over long haul link 418 to remote bridge 420. Bridge 420 converts and transmits the data to the front-end of the remote subordinate controller 430 via SCSI bus 422. Remote controller 430 thereafter writes the data to storage devices 434 (which may be magnetic disk drives) via SCSI data buses 432.

The local superordinate controller 410 also has local copying capability. Data output by controller 410 at another of its back-end ports is transmitted to the front-end of local subordinate controller 470 via SCSI data bus 414. Local subordinate controller 470 writes the data to storage devices 474 via SCSI data buses 472 at the controller's 470 back-end.

The remote host computer 442, which may also be a file server, serves as an independent data source within the system 400. Copies of the data provided by host computer 442 are accomplished both locally and remotely using an architecture which is substantially similar to that described for local site 401. That is, data transmitted by host computer 442 to superordinate controller 450 is stored both locally and remotely. Specifically, data transmitted by host computer 442 to superordinate controller 450 is distributed via the back-end ports of superordinate controller 450 to local subordinate controller 430 and remote subordinate controller 470. Data stored locally by controller 430 is received from controller 450 via local SCSI bus 436, and stored in magnetic disks 434. Data stored remotely by controller 470 is transmitted to bridge 454 via SCSI bus 452, converted to serial form, and transmitted over long haul link 456 to bridge 458. Bridge 458 converts the data back to parallel SCSI form and transmits it to controller 470, which stores the data in disks 474. As shown in FIG. 4, not only is the remote configuration 403 substantially similar to local configuration 401, but the two sites are also integrated to form one system 400 with full local and remote redundancy for each host computer 402, 442.

While the invention has been shown and described with reference to a preferred embodiment thereof, it will be understood by those skilled in the art that various changes in form and detail may be made herein without departing from the spirit and scope of the invention as defined by the appended claims. For example, while the configurations shown herein include two fully operational sites, each could easily be extended to add other sites. While controllers with only one front-end port was shown, controllers comprising additional front-end ports could also be used and are considered to be within the scope of the present invention. Furthermore, if increased storage capacity were desired, rather than disaster tolerance, the controllers of FIGS. 2, 3, and 4 could alternatively be configured for storage of non-redundant data, rather than redundant data. Also, a system could be arranged with local storage of redundant data only, and still take advantage of the cascaded configuration of the controllers described herein. Generally, the terms "data" and "database" are used interchangeably herein, because the invention applies equally to storage of either.

What is claimed is:

1. A data storage device, comprising:
   a local data storage controller having a first input port which receives data to be stored and a plurality of output ports to which data received at the first input port is distributed;
   a remote data storage controller having a second input port which receives data to be stored and a plurality of output ports to which data received at the second input port is distributed;
   a remote communication link which connects one of the plurality of output ports from the local data storage controller to the second input port;
   a third data storage controller having a third input port which receives data and a plurality of output ports to which data received at the third input port is distributed; and
   a second remote data storage controller having a fourth input port which receives data and a plurality of output ports to which data received at the fourth input port is distributed;
   a first data connection which connects one of the plurality of output ports of the local data storage controller to the third input port; and
   a second remote communication link which connects one of the plurality of outputs from the second remote data storage controller to the third data storage controller.

2. The data storage device of claim 1, further comprising:
   a first host device, capable of transmitting data, connected to the first input port;
   a second host device, capable of transmitting data, connected to the fourth input port; and
   a data storage medium connected to an output port of the third data storage controller.

3. The data storage device of claim 1, further comprising a fourth data connection, wherein the fourth data connection connects an output port of the second remote data storage controller to the remote data storage controller.

4. The data storage device of claim 3, wherein the first remote communication link comprises:
   a first gateway device having a first local port and a first remote port, wherein the first local port is connected to one of the plurality of output ports of the local data storage controller;
   a second gateway device having a second local port and a second remote port, wherein the second local port is connected to the second input port; and
   a first long distance connection which connects the first remote port to the second remote port.

5. The data storage device of claim 4, wherein the second remote communication link comprises:
   a third gateway device having a third local port and a third remote port, wherein the third local port is connected to one of the plurality of output ports of the second remote data storage controller;
   a fourth gateway device having a fourth local port and a fourth remote port, wherein the fourth local port is connected to the third data storage controller; and
   a second long distance connection which connects the third remote port to the fourth remote port.

6. A method for storing data, comprising the steps:
   (A) receiving data at an input port of a local data storage controller;
   (B) distributing the data to a plurality of output ports of the local data storage controller;
   (C) transmitting the data from one of the output ports of the local data storage controller to an input port of a remote data storage controller; and
   (D) distributing the data to a plurality of output ports of the remote data storage controller;
   (E) transmitting the data from one of the output ports of the local data storage controller to at least one input port of a third data storage controller;
   (F) distributing the data to at least one of a plurality of output ports of the third data storage controller;
   (G) receiving second data at an input port of a second remote data storage controller;
   (H) distributing the second data from the input port of the second remote data storage controller to a plurality of output ports of the second remote data storage controller;

(I) transmitting the second data from one of the output ports of the second remote data storage controller to an input port of the remote data storage controller; and (J) distributing the second data from the input port of the remote data storage controller to an output port of the remote data storage controller.

7. The method for storing data of claim 6, further comprising the steps of:

(K) transmitting the second data from one of the available output ports of the second remote data storage controller over a second remote communication link to an input port of the third data storage controller; and (L) distributing the second data from the input port of the third data storage controller to a plurality of output ports of the third data storage controller.

8. The method for storing data of claim 7, further comprising the steps of:

(M) transmitting the first data from a first host to at least one of the input ports of the local data storage controller;

(N) writing the first data from an output port of the third data storage controller to a first data storage medium; and (O) writing the first data from an output port of the remote data storage controller to a second data storage medium.

9. The method for storing data of claim 7, further comprising the steps of:

(M) transmitting the second data from a second host to at least one of the input ports of the second remote data storage controller;

(N) writing the second data from an output port of the remote data storage controller to a first data storage medium; and (O) writing the second data from an output port of the third data storage controller to a second data storage medium.

* * * * *